(12) United States Patent
Tanaka et al.

(10) Patent No.: US 7,202,306 B2
(45) Date of Patent: Apr. 10, 2007

(54) METHOD FOR PRODUCING MODIFIED CONJUGATED DIENE POLYMER AND RUBBER COMPOSITION

(75) Inventors: Ryouji Tanaka, Mie (JP); Takuo Sone, Mie (JP); Toshihiro Tadaki, Mie (JP)

(73) Assignee: JSR Corporation, Tokyo (JP)

( * ) Notice: Subject to any disclaimer, the term of this patent is extended or adjusted under 35 U.S.C. 154(b) by 343 days.

(21) Appl. No.: 10/849,786

(22) Filed: May 21, 2004

(65) Prior Publication Data

US 2005/0009979 A1 Jan. 13, 2005

(30) Foreign Application Priority Data

May 22, 2003 (JP) ............................. 2003-144227

(51) Int. Cl.
*C08F 36/06* (2006.01)
*C08C 19/25* (2006.01)

(52) U.S. Cl. ............................... 525/331.9; 525/333.1; 525/333.2; 525/333.6; 525/342; 525/377; 525/386; 525/383

(58) Field of Classification Search ............. 525/331.9, 525/333.1, 333.2, 333.6, 342, 377, 386, 383
See application file for complete search history.

(56) References Cited

U.S. PATENT DOCUMENTS 6,462,141 B1 10/2002 Kim et al.

2006/0030677 A1 * 2/2006 Ozawa et al. ............... 525/342

FOREIGN PATENT DOCUMENTS

| WO | 91/06580 | | 5/1991 |
|---|---|---|---|
| WO | 01/34658 | | 5/2001 |
| WO | 03/046020 | | 6/2003 |
| WO | WO 03/046020 | * | 6/2003 |
| WO | 03/087171 | | 10/2003 |
| WO | WO 03/087171 | * | 10/2003 |

* cited by examiner

*Primary Examiner*—Roberto Rabago
(74) *Attorney, Agent, or Firm*—Oblon, Spivak, McClelland, Maier & Neustadt, P.C.

(57) ABSTRACT

Disclosed are a method for producing a modified conjugated diene polymer improved in quality stability, more enhanced in low heat buildup and reinforcing ability when used in a rubber composition, excellent in wear resistance, mechanical characteristics and processability, and improved in cold flow; and a rubber composition using the same. The method includes a step of modifying an active end of an active end-containing conjugated diene polymer having a cis-1,4-bond content of 75% or more with an alkoxysilane compound containing at least one functional group selected from the group consisting of (a) an epoxy group, (b) an isocyanate group and (c) a carboxyl group, and a step of adding a condensation accelerator to conduct condensation reaction of the alkoxysilane compound (residue) in an aqueous solution having a pH of 9 to 14 and a temperature of 85 to 180° C.

10 Claims, No Drawings

METHOD FOR PRODUCING MODIFIED CONJUGATED DIENE POLYMER AND RUBBER COMPOSITION

BACKGROUND OF THE INVENTION (1) Field of the Invention

The present invention relates to a method for producing a modified conjugated diene polymer and a rubber composition using the modified conjugated diene polymer obtained thereby. More particularly, the present invention relates to a method for producing a modified conjugated diene polymer enhanced in low heat buildup (low fuel consumption) and reinforcing ability with a filler and excellent in quality stability, and a rubber composition using the modified conjugated diene polymer obtained thereby.

(2) Description of the Related Art

In relation to recent social requests for energy saving, requirements for low fuel consumption of automobiles are becoming severer. In order to comply with such requirements, it has been required that the rolling resistance of tires is further decreased also in tire performance. As techniques for decreasing the rolling resistance of tires, there have also been studied techniques of optimizing tire structures. However, it has been employed as the most general technique that materials lower in heat buildup are used as rubber compositions.

In order to obtain such rubber compositions having low heat buildup, there have hitherto been performed many technical developments of modified rubbers for rubber compositions using silica or carbon black as a filler. Of these, methods of modifying polymerization active ends of conjugated diene polymers obtained by anionic polymerization using organic lithium compounds with alkoxylsilane derivatives having functional groups which interact with the filler has been proposed as effective methods.

However, many of them are applied to polymers in which the living properties of the polymer ends can be easily secured, and a few are applied to the improvement by modification of cis-1,4-polybutadiene particularly important in tire side wall rubber and tire tread rubber. Further, the effect of modifying the rubber compositions into which silica or carbon black have been incorporated is not necessarily sufficient. In particularly, for cis-1,4-polybutadiene, the effect of modifying the rubber into which carbon black has been incorporated is scarcely obtained in the actual situation.

Further, many of the conventional modification techniques can not sufficiently impart branches to main chains, so that cold flow becomes a serious obstacle in practical application. Partial coupling to comply therewith necessarily poses the problem of decreasing the modification effect.

On the other hand, there is also an attempt to allow an active end of a conjugated diene polymer having a high cis content obtained by use of a rare earth catalyst to react with a functional group-containing alkoxysilane derivative which interacts with a filler, thereby obtaining an end-modifyied conjugated diene polymer. According to this method, the cold flow is effectively improved, but the Mooney viscosity is largely increased with time due to alkoxysilane modification. Accordingly, there has been still room for improvement from the viewpoint of quality stability.

SUMMARY OF THE INVENTION

Under such a situation, an object of the present invention is to provide a method for producing a modified conjugated diene polymer improved in quality stability in a conventional method, more enhanced in low heat buildup and reinforcing ability when used in a rubber composition, excellent in wear resistance, mechanical characteristics and processability, and improved in cold flow.

Another object of the invention is to provide a rubber composition using the above-mentioned modified conjugated diene polymer.

In order to achieve the above-mentioned objects, the present inventors have made intensive studies. As a result, the inventors have discovered that it is useful for obtaining the above-mentioned modified conjugated diene polymer to include a step of modifying an active end of an active end-containing conjugated diene polymer with a specific alkoxysilane compound, and a step of adding a condensation accelerator to conduct condensation reaction of a residue of the alkoxysilane compound under a specified condition.

According to the present invention, there are provided (1) A method for producing a modified conjugated diene polymer, the method comprising a step of modifying an active end of an active end-containing conjugated diene polymer having a cis-1,4-bond content of 75% or more with an alkoxysilane compound containing at least one functional group selected from the group consisting of (a) an epoxy group, (b) an isocyanate group and (c) a carboxyl group, and a step of adding a condensation accelerator to conduct condensation reaction of the alkoxysilane compound (residue) in an aqueous solution having a pH of 9 to 14 and a temperature of 85 to 180° C.;

(2) The method described in the above (1), wherein a compound containing at least one functional group selected from the group consisting of (d) an amino group, (e) an imino group and (f) a mercapto group is further added; and (3) A rubber composition comprising a rubber component containing the modified conjugated diene polymer produced by the method described in the above (1) or (2) and carbon black and/or silica.

DESCRIPTION OF THE PREFERRED EMBODIMENTS

The method of the present invention is characterized in that it comprises a step of modifying an active end of an active end-containing conjugated diene polymer having a cis-1,4-bond content of 75% or more with an alkoxysilane compound containing at least one functional group selected from the group consisting of (a) an epoxy group, (b) an isocyanate group and (c) a carboxyl group, and a step of adding a condensation accelerator to conduct condensation reaction of a residue of the alkoxysilane compound introduced into the end with the residual alkoxysilane compound or a newly added functional group-containing compound in an aqueous solution having a pH of 9 to 14 and a temperature of 85 to 180° C.

Although the condensation accelerator is usually added after the alkoxysilane compound has been added to the active end of the conjugated diene polymer to conduct the modification reaction and before the condensation reaction, it may be added before the addition of the alkoxysilane compound (before the modification reaction), and then, the alkoxysilane compound may be added to conduct the modification reaction, followed by adjustment of a reaction system to a pH of 9 to 12 and a temperature of 85 to 180° C., thus conducting the condensation reaction.

The above-mentioned active end-containing polymer can be produced using a solvent or under solvent-free conditions. The polymerization solvents include inactive organic solvents, for example, a saturated aliphatic hydrocarbon having 4 to 10 carbon atoms such as butane, pentane, hexane or heptane, a saturated cyclic hydrocarbon having 6 to 20 carbon atoms such as cyclopentane or cyclohexane, an aromatic hydrocarbon such as benzene, toluene or xylene, and a halogenated hydrocarbon such as methylene chloride, chloroform, carbon tetrachloride, trichloroethylene, perchloroethylene, 1,2-dichloroethane, chlorobenzene, bromobenzene or chlorotoluene.

The temperature of the polymerization reaction in the present invention is usually from $-30°$ C. to $+200°$ C., and preferably from $0°$ C. to $+150°$ C. There is no particular limitation on the type of polymerization reaction, and the reaction may be either conducted using a batch type reactor or continuously conducted using an apparatus such as a multistage continuous reactor.

When the polymerization solvent is used, the concentration of a monomer contained in the solvent is usually from 5 to 50% by weight, and preferably from 7 to 35% by weight.

In order to produce the polymer, and in order to prevent the active end-containing polymer from being inactivated, care is required to be taken to decrease as much as possible the inclusion of a compound having an inactivation function, such as oxygen, water or carbon dioxide, in a polymerization system.

The conjugated diene compounds used as polymerization monomers in the present invention include 1,3-butadiene, isoprene, 2,3-dimethyl-1,3-butadiene, 1,3-pentadiene, 1,3-hexadiene and myrcene, and preferred are 1,3-butadiene, isoprene and 2,3-dimethyl-1,3-butadiene. These conjugated diene compounds can be used either alone or as a combination of two or more of them. When they are used as a combination of two or more of them, a copolymer is obtained.

There is no particular limitation on the method for producing the above-mentioned active end-containing conjugated diene polymer, and a method known in the art can be used. However, as a polymerization catalyst, there is preferably used a combination of at least one compound selected from each of the following components (g), (h) and (i):

Component (g):

Component (g) is a compound containing a rare earth element having an atomic number of 57 to 71 in the periodic table or a reaction product of the compound with a Lewis base.

As the rare earth elements, preferred are neodymium, praseodymium, cerium, lanthanum, gadolinium and a combination thereof, and more preferred is neodymium.

The rare earth element-containing compounds used in the present invention include a carboxylate, an alkoxide, a β-diketone complex, a phosphate and a phosphite.

The carboxylate of the rare earth element is represented by the general formula of $(R^4-CO_2)_3M$, wherein M is a rare earth element having an atomic number of 57 to 71 in the periodic table; $R^4$ indicates a hydrocarbon group having 1 to 20 carbon atoms, preferably a saturated or unsaturated alkyl group, which is straight-chain, branched or cyclic; and the carboxyl group is bonded to a primary, secondary or tertiary carbon atom of the hydrocarbon group. Specific examples thereof include salts of octanoic acid, 2-ethylhexanoic acid, oleic acid, stearic acid, benzoic acid, naphthenic acid and Versatic Acid (a trade name of a product manufactured by Shell Chemicals, a carboxylic acid in which a carboxyl group is bonded to a tertiary carbon atom), and preferred are 2-ethylhexanoic acid, naphthenic acid and Versatic Acid.

The alkoxide of the rare earth element is represented by the general formula of $(R^5O)_3M$, wherein M is a rare earth element having an atomic number of 57 to 71 in the periodic table; $R^5$ indicates a hydrocarbon group having 1 to 20 carbon atoms, preferably a saturated or unsaturated alkyl group, which is straight-chain, branched or cyclic; and the carboxyl group is bonded to a primary, secondary or tertiary carbon atom of the hydrocarbon group. Examples of alkoxyl groups represented by $R^5O$ include alkoxyl groups of 2-ethylhexyl, oleyl, stearyl, phenyl and benzyl. Of these, preferred are the alkoxyl groups of 2-ethylhexyl and benzyl.

The β-diketone complexes of the rare earth elements include acetylacetone, benzoylacetone, propionylacetone, valerylacetone and ethylacetylacetone complexes of the rare earth elements. Of these, preferred are the acetylacetone and ethylacetylacetone complexes.

The phosphates and phosphites of the rare earth elements include rare earth element salts of bis(2-ethylhexyl)phosphate, bis (1-methylheptyl)phosphate, bis(p-nonylphenyl) phosphate, bis(polyethylene glycol p-nonylphenyl)phosphate, (1-methylheptyl)(2-ethylhexyl)phosphate, (2-ethylhexyl)(p-nonylphenyl)phosphate, mono-2-ethylhexyl 2-ethylhexylphosphonate, mono-p-nonylphenyl 2-ethylhexylphosphonate, bis(2-ethylhexyl)phosphinic acid, bis(1-methylheptyl)phosphinic acid, bis(p-nonylphenyl) phosphinic acid, (1-methylheptyl)(2-ethylhexyl)phosphinic acid and (2-ethylhexyl)(p-nonylphenyl)phosphinic acid, and preferred examples thereof include the salts of bis(2-ethylhexyl) phosphate, bis(1-methylheptyl)phosphate, mono-2-ethylhexyl 2-ethylhexylphosphonate and bis(2-ethylhexyl) phosphinic acid.

Of the compounds exemplified above, particularly preferred are the phosphates of neodymium and the carboxylates of neodymium, and most preferred are the carboxylates such as neodymium 2-ethylhexanoate and neodymium versatate.

The Lewis base used in order to easily solubilize the above-mentioned rare earth element-containing compound in the solvent is used in an amount of 0 to 30 moles, preferably 1 to 10 moles, per mole of metal compound of rare earth element, as a combination of both or a product obtained by previously reacting both.

The Lewis bases as used herein include, for example, acetylacetone, tetrahydrofuran, pyridine, N,N-dimethylformamide, thiophene, diphenyl ether, triethylamine, an organic phosphorous compound and a monohydric or dihydric alcohol.

The compounds of component (g) described above can be used either alone or as a combination of two or more of them.

Component (h):

Component (h) is an alumoxane and/or an organic aluminum compound corresponding to $AlR^1R^2R^3$ (wherein $R^1$ and $R^2$, which may be the same or different, are hydrogen atoms or hydrocarbon groups having 1 to 10 carbon atoms, and $R^3$ is a hydrocarbon group having 1 to 10 carbon atoms, and may be the same as the above-mentioned $R^1$ and $R^2$, or different therefrom). A plurality of compounds of component (h) can be used at the same time.

The alumoxane used as the catalyst in the present invention is a compound having a structure represented by the following formula (I) or (II):

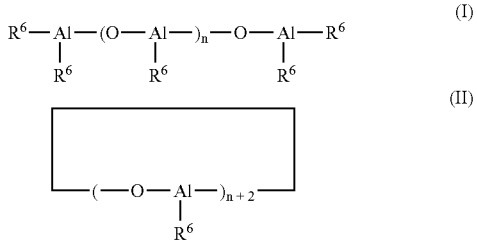

wherein $R^6$s, which may be the same or different, are hydrocarbon groups having 1 to 20 carbon atoms, and n is an integer of 2 or more.

Further, the alumoxane may be an associated body of an alumoxane as shown in *Fine Chemical*, 23 (9), 5 (1994), *J. Am. Chem. Soc.*, 115, 4971 (1993) and *J. Am. Chem. Soc.*, 117, 6465 (1995).

In the alumoxane represented by formula (I) or (II), the hydrocarbon groups represented by $R^6$ include methyl, ethyl, propyl, butyl, isobutyl, t-butyl, hexyl, isohexyl, octyl and isooctyl groups. Preferred are methyl, ethyl, isobutyl and t-butyl groups, and particularly preferred is a methyl group. Further, n is an integer of 2 or more, and preferably an integer of 4 to 100.

Specific examples of the alumoxanes include methylalumoxane, ethylalumoxane, n-propylalumoxane, n-butylalumoxane, isobutylalumoxane, t-butylalumoxane, hexylalumoxane and isohexylalumoxane.

The alumoxane may be produced by any technique known in the art, and can be produced, for example, by adding an trialkylaluminum or a dialkylaluminum monochloride to an organic solvent such as benzene, toluene or xylene, and further adding water, steam, steam-containing nitrogen gas or a salt containing crystallization water such as copper sulfate pentahydrate or aluminum sulfate hexadecahydrate to conduct reaction.

The alumoxanes can be used either alone or as a combination of two or more of them.

The organic aluminum compounds corresponding to $AlR^1R^2R^3$ (wherein $R^1$ and $R^2$, which may be the same or different, are hydrogen atoms or hydrocarbon groups having 1 to 10 carbon atoms, and $R^3$ is a hydrocarbon group having 1 to 10 carbon atoms, and may be the same as the above-mentioned $R^1$ and $R^2$, or different therefrom), the other component (h) used as the catalyst in the present invention, include trimethylaluminum, triethylaluminum, tri-n-propylaluminum, triisopropylaluminum, tri-n-butylaluminum, tri-isobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihalide, n-propylaluminum dihalide and isobutylaluminum dihalide, and preferred are tri-ethylaluminum, triisobutylaluminum, diethylaluminum hydride and diisobutylaluminum hydride.

The organic aluminum compounds, component (h) used in the present invention, can be used either alone or as a combination of two or more of them.

Component (i):

Component (i) used as the catalyst in the present invention is a halogen-containing compound, and preferred examples thereof include a reaction product of a metal halide with a Lewis base, diethylaluminum chloride, silicon tetrachloride, trimethylchlorosilane, methyldichlorosilane, dimethyldichlorosilane, methyltrichlorosilane, ethylaluminum dichloride, ethylaluminum sesquichloride, tin tetrachloride, tin trichloride, phosphorus trichloride, benzoyl chloride and t-butyl chloride.

The above-mentioned metal halides as used herein include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide and gold bromide. Preferred are magnesium chloride, calcium chloride, barium chloride, manganese chloride, zinc chloride and copper chloride, and particularly preferred are magnesium chloride, manganese chloride, zinc chloride and copper chloride.

Further, the Lewis base allowed to react for producing the reaction product with the above-mentioned metal halide is preferably a phosphorus compound, a carbonyl compound, a nitrogen compound, an ether compound or an alcohol. Specific examples thereof include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethylmalonate, diphenylmalonate, aceticacid, octanoic,acid, 2-ethylhexanoic acid, oleic acid, stearic acid, benzoic acid, naphthenic acid, Versatic Acid (a trade name of a product manufactured by Shell Chemicals, a carboxylic acid in which a carboxyl group is bonded to a tertiary carbon atom), triethylamine, N,N-dimethylacetamide, tetrahydrofuran, diphenyl ether, 2-ethylhexyl alcohol, oleyl alcohol, stearyl alcohol, phenol, benzyl alcohol, 1-decanol and lauryl alcohol, and preferred are tri-2-ethylhexyl phosphate, tricresyl phosphate, acetylacetone, 2-ethylhexanoic acid, Versatic Acid, 2-ethylhexyl alcohol, 1-decanol and lauryl alcohol.

The above-mentioned Lewis base is allowed to react in an amount of 0.01 to 30 moles, preferably in an amount of 0.5 to 10 moles, per mole of the above-mentioned metal halide. The use of the reaction product with the Lewis base allows metal remaining in the polymer to decrease.

The amount of each component and the composition ratio of the catalyst used in the present invention are set to various different values depending on its purpose and necessity.

Of these, component (g) is preferably used in an amount of 0.00001 to 1.0 mmol based on 100 g of the conjugated diene compound. Less than 0.00001 mmol unfavorably results in a decrease in polymerization activity, whereas exceeding 1.0 mmol results in an increase in catalyst concentration, which unfavorably requires a catalyst removal step. In particular, component (g) is preferably used in an amount of 0.0001 to 0.5 mmol.

Further, in general, the amount of component (h) used can be represented by the molar ratio of Al to component (g). The ratio of component (g) to component (h) is from 1:1 to 1:500, preferably from 1:3 to 1:250, and more preferably from 1:5 to 1:200.

Furthermore, the molar ratio of component (g) to component (i) is from 1:0.1 to 1:30, and preferably from 1:0.2 to 1:15.

When the catalyst amount and constituent component ratios are outside the above-mentioned ranges, the catalyst does not acts as a highly active catalyst, or the catalyst removal step is unfavorably required. Further, in order to adjust the molecular weight of the polymer, the polymerization reaction may be conducted with hydrogen gas coexisting, in addition to the above-mentioned components (g) to (i).

In addition to the above-mentioned components (g) to (i), a conjugated diene compound and/or a non-conjugated diene compound may be used as a catalyst component in an amount of 0 to 1,000 moles per mole of the compound of component (g) as needed. As the conjugated diene compound used for the production of the catalyst, there can be used the same monomer as that for polymerization, such as 1,3-butadiene or isoprene. Further, the non-conjugated diene compounds include, for example, divinylbenzene, diisopropenylbenzene, triisopropenylbenzene, 1,4-vinylhexadiene and ethylidene norbornene. The conjugated diene compound is not indispensable as the catalyst. However, the use thereof in combination provides the advantage that the catalytic activity is further improved.

The catalyst used in the present invention is produced, for example, by reacting components (g) to (i) dissolved in a solvent, further the conjugated diene compound and/or the non-conjugated diene compound as needed. In that case, the addition order of the respective components may be any. It is preferred from the viewpoints of improvement in polymerization activity and shortening of a polymerization induction period that these respective components are previously mixed, allowed to react and matured. The maturing temperature as used herein is from 0 to 100° C., and preferably from 20 to 80° C. Lower than 0° C. results in insufficient maturation, whereas exceeding 100° C. unfavorably results in a reduction in catalytic activity or broadening of a molecular weight distribution. There is no particular limitation on the maturing time, and the components can also be brought into contact with one another in a line before the addition thereof to a polymerization reaction vessel. Usually, a maturing time of 0.5 minutes or more is sufficient, and the resultant is stable for several days.

The cis-1,4-bond content of the above-mentioned active end-containing conjugated diene polymer is 75% or more, preferably 85% or more, and more preferably from 90% to 99.9%, and the ratio (Mw/Mn) of the weight average molecular weight (Mw) to the number average molecular weight (Mn) measured by gel permeation chromatography is preferably from 1.01 to 5, and more preferably from 1.01 to 4.

When the cis-1,4-bond content is less than 75%, mechanical characteristics and wear resistance after vulcanization are deteriorated.

Further, when the ratio (Mw/Mn) exceeds 5, mechanical characteristics, wear resistance and low heat buildup after vulcanization are deteriorated.

Here, the cis-1,4-bond content can be easily adjusted by controlling the polymerization temperature, and the ratio (Mw/Mn) can be easily adjusted by controlling the molar ratios of the above-mentioned components (g) to (i).

The Mooney viscosity ($ML_{1+4}$, 100° C.) of the above-mentioned active end-containing conjugated diene polymer at 100° C. is within the range of 5 to 50, and preferably from 10 to 40. Less than 5 results in poor mechanical characteristics and wear resistance after vulcanization, whereas exceeding 50 results in poor processability in kneading the modified conjugated diene polymer after the modification and condensation reactions have been conducted.

The Mooney viscosity can be easily adjusted by controlling the molar ratios of the above-mentioned components (g) to (i).

In the modification reaction in the present invention, as the alkoxysilane compound (hereinafter also referred to as a "modifier") used for the reaction with the active end of the conjugated diene polymer, there is used an alkoxysilane compound having at least one functional group selected from the group consisting of (a) an epoxy group, (b) an isocyanate group and (c) a carboxyl group. The above-mentioned alkoxysilane compound may be a partial condensate or a combination of the alkoxysilane compound and the partial condensate.

The partial condensate as used herein means a condensate in which SiOR's of the alkoxysilane compound is partly (not all) condensed to form SiOSi bonds.

In the above-mentioned modification reaction, the polymer to be used is preferably a polymer in which at least 10% of polymer chains have living activity.

As specific examples of the alkoxysilane compounds used for the reaction with the active end of the polymer, the epoxy group-containing alkoxysilane compounds preferably include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane. Of these, 3-glycidoxypropyltrimethoxysilane and 2-(3,4-epoxycyclohexyl)ethyltrimethoxysilane are particularly suitable.

Further, the isocyanate group-containing alkoxysilane compounds include 3-isocyanatopropyltrimethoxysilane, 3-isocyanatopropyltriethoxysilane, 3-isocyanatopropylmethyldiethoxysilane and 3-isocyanatopropyltriisopropoxysilane. Of these, particularly preferred is 3-isocyanatopropyltriethoxysilane.

Furthermore, the carboxyl group-containing alkoxysilane compounds include 3-methacryloyloxypropyltriethoxysilane, 3-methacryloyloxypropyltrimethoxysilane, 3-methacryloyloxypropylmethyldiethoxysilane and 3-methacryloyloxypropyltriisopropoxysilane. Of these, particularly preferred is 3-methacryloyloxypropyltrimethoxysilane.

These alkoxysilane compounds may be used either alone or as a combination of two or more of them. Further, a partial condensate of the above-mentioned alkoxysilane compound can also be used.

The amount of the above-mentioned alkoxysilane compound used in the modification reaction is preferably from 0.01 to 200, and more preferably from 0.1 to 150, in molar ratio based on the above-mentioned component (g). When the amount is less than 0.01, the modification reaction insufficiently proceeds, the dispersibility of a filler is not sufficiently improved, and mechanical characteristics, wear resistance and low heat buildup after vulcanization are deteriorated. On the other hand, the use of the alkoxysilane compound in a molar ratio exceeding 200 results in saturation of the modification reaction, which is economically unfavorable.

There is no particular limitation on the method of adding the above-mentioned modifier. The method includes batch addition, divided addition or continuous addition, and batch addition is the preferred one.

It is preferred that the modification reaction in the present invention is conducted by solution reaction (the solution may contain an unreacted monomer used in polymerization).

There is no particular limitation on the type of modification reaction, and the reaction may be conducted using a batch type reactor or continuously conducted using an apparatus such as a multistage continuous reactor or an inline mixer. It is important to conduct the modification reaction before desolvating treatment, water treatment, heat treatment and various operations necessary for isolating the polymer are carried out after the completion of the polymerization reaction.

As the temperature of the modification reaction, the polymerization temperature of the conjugated diene polymer can be used as such. Specifically, it is preferably within the range of 20 to 100° C., and more preferably from 40 to 90° C. The viscosity of the polymer tends to increase with a decrease in temperature, and the polymerization active end is liable to be inactivated with an increase in temperature. Accordingly, both are unfavorable.

Further, the modification reaction time is usually from 5 minutes to 5 hours, and preferably from 15 minutes to 1 hour.

In the present invention, a known antioxidant or reaction terminator can be added during the modification reaction as desired at a step after the alkoxysilane compound residue has been introduced into the active end of the polymer.

In the present invention, a functional group-containing compound (hereinafter also referred to as "a functional group-introducing agent") can be further added. With respect to the time of addition, it is preferably added at a step after the alkoxysilane compound residue has been introduced into the active end of the polymer described above. Although there is no particular limitation on the functional group-introducing agent as long as it is a compound which can introduce a functional group in polymerization, a functional group-containing alkoxysilane compound is preferred in terms of wear resistance.

Although there is no particular limitation on the time of addition of the functional group-introducing agent used herein, it is preferably added before the initiation of the condensation reaction. When the functional group-introducing agent is added after the initiation of the condensation reaction, it does not sufficiently disperse to cause deterioration of catalytic performance in some cases. The functional group-introducing agent is preferably added 5 minutes to 5 hours after the initiation of the modification reaction, particularly 15 minute to 1 hour after the initiation of the modification reaction.

Usually, the functional group-introducing agent used herein does not substantially directly react with the active end, and remains as an unreacted compound in the reaction system. Accordingly, it is consumed by the condensation reaction with the alkoxysilane compound residue introduced into the active end.

As the functional group-introducing agent newly added, an alkoxysilane compound containing at least one functional group selected from the group consisting of (d) an amino group, (e) an imino group and (f) a mercapto group is preferably used. The alkoxysilane compound used as the functional group-introducing agent may be a partial condensate or a combination of the alkoxysilane compound and the partial condensate.

Specific examples of the functional group-introducing agents newly added include amino group-containing alkoxysilane compounds such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl (triethoxy)silane, 3-aminopropyltrimethoxysilane, 3-aminopropyltriethoxysilane, aminophenyltrimethoxysilane, aminophenyltriethoxysilane, 3-(N-methylamino)propyltrimethoxysilane and 3-(N-methylamino)propyltriethoxysilane. Of these, 3-diethylaminopropyl(triethoxy)silane, 3-diethylaminopropyl(triethoxy)silane, 3-dimethylaminopropyl(triethoxy)silane and 3-aminopropyltriethoxysilane are suitable.

Further, preferred examples of the imino group-containing alkoxysilane compounds include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane and N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl) 1-propaneamine, trimethoxysilyl compounds, methyldiethoxysilyl compounds, ethyldiethoxysilyl compounds, methyldimethoxysilyl compounds and ethyldimethoxysilyl compounds corresponding to these triethoxysilyl compounds, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole and N-(3-methyldiethoxysilylpropyl)-4,5-dihydroimidazole. Of these, particularly preferred are 3-(1-hexamethyleneimino) propyl(triethoxy)silane, N-(1-methylpropylidene)-3-(triethoxysilyl)-1-propaneamine, N-(1,3-dimethylbutylidene)-3-(triethoxysilyl)-1-propaneamine, 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole and N-(3-triethoxysilylpropyl)-4,5-dihydroimidazole.

Further, the mercapto group-containing alkoxysilane compounds include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane and mercaptophenyltriethoxysilane. Of these, preferred is 3-mercaptopropyltriethoxysilane.

These functional group-introducing agents may be used either alone or as a combination of two or more of them.

In the above-mentioned modification method in the present invention, when a functional group-containing alkoxysilane compound is used as a functional group-introducing agent, the active end-containing polymer and a substantially stoichiometric amount of the alkoxysilane compound added to the reaction system are allowed to react with each other to introduce alkoxysilyl groups into substantially all of the ends (modification reaction), and the alkoxysilane compound is further added, thereby introducing one or more equivalents of alkoxysilyl compound residues into the active ends.

It is preferred that the condensation reaction between the alkoxysilyl groups occurs between the free alkoxysilane (remaining or newly added) and the alkoxysilyl group of the polymer end. Further, in some cases, it is preferred that the condensation reaction occurs between the alkoxysilyl groups of the polymer ends. The reaction between the free alkoxysilanes is unnecessary. Accordingly, when the alkoxysilane compound is newly added, it is preferred in terms of efficiency that hydrolytic ability of the alkoxysilane compound newly added does not exceed that of the alkoxysilane compound of the polymer end. For example, a combination of a trimethoxysilyl group-containing compound high in hydrolytic ability as the alkoxysilane compound used for the reaction with the active end of the polymer and a compound containing an alkoxysilyl group (for example, triethoxysilyl group) inferior to the above-mentioned compound in hydrolytic ability as the alkoxysilane compound newly added is suitable. Conversely, it is included in the scope of the present invention to use, for example, the triethoxysilyl group-containing compound as the alkoxysilane compound used for the reaction with the active end of the polymer, and the trimethoxysilyl group-containing compound as the alkoxysilane compound newly added. However, this combination is unfavorable from the viewpoint of reaction efficiency.

The amount of the above-mentioned functional group-containing alkoxysilane compound used as the functional group-introducing agent is preferably from 0.01 to 200, and more preferably from 0.1 to 150, in molar ratio based on the above-mentioned component (g). When the amount is less than 0.01, the modification reaction insufficiently proceeds, the dispersibility of a filler is not sufficiently improved, and mechanical characteristics, wear resistance and low heat buildup after vulcanization are deteriorated. On the other hand, the use of the alkoxysilane compound exceeding 200 results in saturation of the modification reaction, which is economically unfavorable.

In the present invention, a condensation accelerator is used for accelerating the condensation reaction of the above-mentioned alkoxysilane compound used as the above-mentioned modifier (and the functional group-containing alkoxysilane compound sometimes used as the functional group-introducing agent).

The condensation accelerator used herein can also be added before the above-mentioned modification reaction. However, it is preferably added after the modification reaction and before the initiation of the condensation reaction. When the condensation accelerator is added before the modification reaction, direct reaction with the active end occurs, resulting in failure to introduce the alkoxysilyl group into the active end in some cases. When added after the initiation of the condensation reaction, the condensation accelerator does not sufficiently disperse to cause deterioration of catalytic performance in some cases. Usually, the condensation accelerator is preferably added 5 minutes to 5 hours after the initiation of the modification reaction, particularly 15 minute to 1 hour after the initiation of the modification reaction.

As the condensation accelerator, there can be used at least one compound (hereinafter also referred to as "a tin compound") selected from the group consisting of component (j) (a carboxylate of divalent tin) and component (k) (a hydroxyl group-containing or carboxyl group-containing tetravalent tin compound).

As the above-mentioned tin compound, there can be suitably used, specifically, a dicarboxylate of divalent tin (particularly preferably a carboxylate having 8 to 20 carbon atoms), a dicarboxylate of tetravalent dialkyltin, a bis (alkyldicarboxylate), a bis(acetylacetonate) and a mono-carboxylate hydroxide. An alkyl group directly bonded to tin has preferably 4 or more carbon atoms, and more preferably 4 to 8 carbon atoms.

Specific examples of the condensation accelerators include tin bis(n-octanoate), tin bis(2-ethylhexanoate), tin bis(laurate), tin bis(naphthoate), tin bis(stearate), tin bis (oleate), dibutyltin diacetate, dibutyltin di-n-octanoate, dibutyltin 2-ethylhexanoate, dibutyltin dilaurate, dibutyltin maleate, dibutyltin bis(benzylmaleate), dibutyltin bis(2-ethylhexylmaleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzylmaleate) and di-n-octyltin bis(2-ethylhexylmaleate).

As the condensation accelerators, preferred are tin bis(2-ethylhexanoate), tin bis(laurate), tin bis(oleate), dibutyltin 2-ethylhexanoate, dibutyltin dilaurate, dibutyltin bis(benzylmaleate), dibutyltin bis(2-ethylhexylmaleate), di-n-octyltin di-2-ethylhexanoate, di-n-octyltin dilaurate, di-n-octyltin bis (benzylmaleate) and di-n-octyltin bis(2-ethylhexylmaleate), and more preferred are tin bis(2-ethylhexanoate), dibutyltin dilaurate and di-n-octyltin dilaurate.

The amount of the condensation accelerator used is preferably from 0.1 to 10, and particularly preferably from 0.5 to 5, in the molar ratio of the number of moles of the above-mentioned tin compound to the total amount of the alkoxysilyl groups existing in the reaction system. Less than 0.1 results in insufficient proceeding of the condensation reaction, whereas the use of the condensation accelerator exceeding 10 results in saturation of an effect as the condensation catalyst, which is economically unfavorable.

The condensation reaction in the present invention is conducted in an aqueous solution. The condensation reaction temperature is from 85 to 180° C., preferably from 100 to 170° C., and more preferably from 110 to 150° C., and the pH of the aqueous solution is from 9 to 14, and preferably from 10 to 12.

When the condensation reaction temperature is less than 85° C., the condensation reaction slowly proceeds, and the condensation reaction can not be completed. Accordingly, the resulting modified conjugated diene polymer changes in quality with time, which poses a problem in quality. On the other hand, exceeding 180° C. results in proceeding of aging reaction of the polymer, which unfavorably deteriorates physical properties of the polymer.

Further, also when the pH of the aqueous solution during the condensation reaction is less than 9, similarly, the condensation reaction slowly proceeds, and the condensation reaction can not be completed. Accordingly, the resulting modified conjugated diene polymer changes in quality with time, which poses a problem in quality. On the other hand, when the pH of the aqueous solution during the condensation reaction exceeds 14, a large amount of alkali-derived components remain in the modified conjugated diene polymer after isolation, and it becomes difficult to remove them.

The condensation reaction time is usually from 5 minutes to 10 hours, and preferably from about 15 minutes to about 5 hours. Less than 5 minutes results in failure to complete the condensation reaction, whereas exceeding 10 hours is unfavorable because the condensation reaction is saturated.

The pressure of the reaction system in the condensation reaction is usually from 0.01 to 20 MPa, and preferably from 0.05 to 10 MPa.

There is no particular limitation on the type of the condensation reaction, and the reaction may be either conducted using a batch type reactor or continuously conducted using an apparatus such as a multistage continuous reactor. Further, this condensation reaction and desolvation may be conducted at the same time.

After the condensation treatment has been conducted as described above, aftertreatments known in the art are performed, thereby being able to obtain the desired modified conjugated diene polymer.

The Mooney viscosity ($ML_{1+4}$, 125° C.) of the modified conjugated diene polymer in the present invention is preferably from 10 to 150, and more preferably from 15 to 100. When the Mooney viscosity is lowered, rubber properties including breaking characteristics tend to deteriorate. On the other hand, higher viscosity results in poor workability, which makes it difficult to knead the polymer with compounding agents.

It is preferred that the rubber composition of the present invention contains the above-mentioned modified conjugated diene polymer as a rubber component in an amount of at least 20% by weight. When the amount is less than 20% by weight, it is difficult to obtain the rubber composition having the desired physical properties, and the object of the present invention is not achieved in some cases. The amount of the modified conjugated diene polymer contained in the rubber components is preferably 30% by weight or more, and particularly suitably 40% by weight or more.

The modified conjugated diene polymers may be used either alone or as a combination of two or more of them. Other rubber components used in combination with the modified conjugated diene polymer include a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, a halogenated butyl rubber and a combination thereof. Further, a part thereof may have a multifunctional branched structure by using a modifier such as tin tetrachloride or silicon tetrachloride.

It is preferred that the rubber composition of the present invention contains carbon black and/or silica as the filler.

There is no particular limitation on the carbon black, and, for example, SRF, GPF, FEF, HAF, ISAF or SAF is used. A carbon black having a iodine adsorption (IA) of 60 mg/g or more and a dibutyl phthalate oil absorption (DBP) of 80 ml/100 g or more is preferred. The use of the carbon black increases the effect of improving gripping performance and breaking resistance characteristics. HAF, ISAF and SAF excellent in wear resistance are particularly preferred.

There is also no particular limitation on the silica, and examples thereof include wet silica (hydrated silicic acid), dry silica (silicic acid anhydride), calcium silicate and aluminum silicate. Of these, the wet silica is preferred which is noticeable in the effect of improving breaking resistance characteristics and the effect of compatibility between wet gripping performance and low rolling resistance.

The carbon black and/or silica may be used either alone or a combination of two or more of them.

The carbon black and/or silica are incorporated in an amount of 20 to 120 parts by weight based on 100 parts by weight of rubber component, and preferably in an amount of 25 to 100 parts by weight from the viewpoints of reinforcing ability and the effect of improving various physical properties thereby. When this amount is small, the effect of improving breaking resistance characteristics etc. is insufficient. On the other hand, when the amount is large, the rubber composition tends to be poor in processability.

The rubber composition of the present invention contains the modified conjugated diene polymer obtained by the above-mentioned method. As the rubber composition, there is generally used a composition comprising a rubber component containing at least 20% by weight of the modified conjugated diene polymer and the silica and/or carbon-black in an amount of 20 to 120 parts by weight, preferably in an amount of 25 to 100 parts by weight, based on 100 parts by weight of the rubber component.

In the rubber composition of the present invention, when the silica is used as the filler for reinforcement, a silane coupling agent can be incorporated in order to further improve its reinforcing ability. The silane coupling agents include, for example, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylpropyl-N,N-dimethylthiocarbamoyltetrasulfide and dimethoxymethylsilylpropylbenzothiazolyltetrasulfide. Of these, bis(3-triethoxysilylpropyl)polysulfides and 3-trimethoxysilylpropylbenzothiazolyltetrasulfide are suitable in terms of the effect of improving reinforcing ability. These silane coupling agents may be used either alone or as a combination of two or more of them.

In the rubber composition of the present invention, the modified polymer in which the functional group having high affinity for the silica is introduced into a molecular end is used as the rubber component, so that the compounding amount of the silane coupling agent can be reduced compared to the ordinary case. Although the preferred compounding amount of the silane coupling agent varies depending on the kind of silane coupling agent, it is usually selected within the range of 1 to 20% by weight. When this amount is small, it is difficult to sufficiently exhibit the effect as the coupling agent. On the other hand, when the amount is large, there is the fear of causing the rubber component to gel. In terms of the effect as the coupling agent and gelation prevention, the compounding amount is preferably within the range of 3 to 15% by weight.

The rubber composition of the present invention can contain various chemicals generally used in the rubber industry, such as a vulcanizing agent, a vulcanization accelerator, a process oil, an antioxidant, an antiscorching agent, zinc white and stearic acid, as long as the object of the invention is not impaired, as desired.

Further, the rubber composition of the present invention is obtained by kneading by use of an open kneader such as a roll kneader, or an internal kneader such as a Banbury mixer, and vulcanized after shaping, thus being applicable to various rubber products. The rubber composition can be used for applications, such as a rubber vibration isolator, a fender beam, a belt, a hose and other industrial products, including tire applications such as a tire tread, an under tread, a carcass, a side wall and a bead portion. In particular, the rubber composition is suitably used as a rubber for a tire tread.

The present invention will be illustrated in greater detail with reference to the following examples, but the invention should not be construed as being limited thereto.

In the examples, parts and percentages are on a weight basis, unless otherwise stated.

Further, various measurements in the examples were made according to the following methods:

Mooney Viscosity ($ML_{1+4}$, 100° C.)

The measurement was made at a temperature of 100° C. for a measuring time of 4 minutes after preheating for 1 minute.

Mooney Viscosity ($ML_{1+4}$, 125° C.)

The measurement was made at a temperature of 125° C. for a measuring time of 4 minutes after preheating for 1 minute.

Molecular Weight Distribution (Mw/Mn)

Using HLC-812OGPC manufactured by Toso Co., Ltd. and a differential refractometer as a detector, the measurement was made under the following conditions:

Column: Column GMHHXL manufactured by Toso Co., Ltd.

Mobile Phase: Tetrahydrofuran

Microstructure (Cis-1,4-Bond Content, 1,2-Vinyl Bond Content)

It was determined by an infrared ray method (the Morero's method).

pH of Aqueous Solution

It was determined with a pH meter.

Cold Flow

The measurement was made by extruding the polymer through a ¼-inch orifice at a pressure of 24.1 kPa at a temperature of 50° C. In order to obtain a steady state, extrusion was continued fro 10 minutes, and then, the extrusion rate was measured. The measured value was indicated by milligrams per minute (mg/min).

Tensile Strength ($T_B$)

The measurement was made according to JIS K6301.

Low Heat BuildUp (3% tan δ)

The measurement was made using a dynamic spectrometer manufactured by Rheometric, Inc., USA, under the following conditions:

Tensile dynamic strain: 3%

Frequency: 15 Hz

Temperature: 50° C.

The measured value was indicated by an index. A larger numerical value is better, because it shows lower heat buildup.

Low-Temperature Characteristics (G' at −20° C.)

The measurement was made using a dynamic spectrometer manufactured by Rheometric., Inc., USA, under the following conditions:

Tensile dynamic strain: 0.1%

Frequency: 15 Hz

Temperature: −20° C.

The measured value was indicated by an index. A larger numerical value is better, because it shows higher low-temperature characteristics (gripping performance on snow and ice roads).

Wear Resistance

Using a Lambourn type abrasion tester (manufactured by Shimada Giken Co., Ltd.), the measurement was made at a slip ratio of 60% at room temperature. A larger index shows better wear resistance.

EXAMPLE 1 (PRODUCTION OF MODIFIED POLYMER A)

A 5-liter autoclave whose inside atmosphere was replaced with nitrogen gas was charged with 2.4 kg of cyclohexane and 300 g of 1,3-butadiene under nitrogen gas. A catalyst, which was previously prepared by reacting and maturing a cyclohexane solution of neodymium versatate (0.09 mmol), a toluene solution of methylalumoxane (hereinafter also referred to as "MAO") (1.8 mmol), a toluene solution of diisobutylaluminum hydride (hereinafter also referred to as "DIBAH") (5.0 mmol) and diethylaluminum chloride (0.18 mmol), and 1,3-butadiene (4.5 mmol) as catalyst components at 50° C. for 30 minutes, was added thereto, and polymerization was conducted at 80° C. for 60 minutes. The reaction conversion of 1,3-butadiene was approximately 100%. Then, 200 g of the resulting polymer solution was taken out, and a methanol solution containing 1.5 g of 2,4-di-tert-butyl-p-cresol was added thereto to terminate polymerization. Thereafter, the solvent was removed by steam stripping, and the resulting reaction product was dried on rolls at 110° C. to obtain a premodified polymer. The results of the polymerization reaction are shown in Table 1.

Further, the remaining polymer solution was maintained at 60° C., and a toluene solution of 3-glycidoxypropyltrimethoxysilane (hereinafter also referred to as "GPMOS") (4.5 mmol) was added thereto, followed by reaction for 30 minutes. Subsequently, a toluene solution of bis(2-ethylhexanoate)tin (hereinafter also referred to as "BEHAT") (13.5 mmol) was added, and mixed for 30 minutes. Thereafter, a methanol solution containing 1.5 g of 2,4-di-tert-butyl-p-cresol was added thereto to obtain 2.5 kg of a modified polymer solution.

Then, the above-mentioned modified polymer solution was added to 20 liters of an aqueous solution adjusted to pH 10 with sodium hydroxide, and condensation reaction was conducted at 110° C. for 2 hours, together with desolvation. The resulting reaction product was dried on rolls at 110° C. to obtain a modified polymer. The conditions of the modification and condensation and the results of the reaction are shown in Table 1.

EXAMPLE 2 (PRODUCTION OF MODIFIED POLYMER B)

A modified polymer was produced by the same manner as with Example 1 with the exception that an aqueous solution adjusted to pH 12 with sodium hydroxide was substituted for the aqueous solution adjusted to pH 10. The conditions of the modification and condensation and the results of the reaction are shown in Table 1.

EXAMPLE 3 (PRODUCTION OF MODIFIED POLYMER C)

A modified polymer was produced by the same manner as with Example 1 with the exception that condensation reaction was conducted at 125° C. for 2 hours, together with desolvation. The conditions of the modification and condensation and the results of the reaction are shown in Table 1.

EXAMPLE 4 (PRODUCTION OF MODIFIED POLYMER D)

A modified polymer was produced by the same manner as with Example 1 with the exception that a toluene solution of dibutyltin dilaurate (hereinafter also referred to as "DBTDL") was substituted for the toluene solution of BEHAT. The conditions of the modification and condensation and the results of the reaction are shown in Table 1.

EXAMPLE 5 (PRODUCTION OF MODIFIED POLYMER E)

A modified polymer was produced by the same manner as with Example 1 with the exception that a toluene solution of 3-isocyanatopropyltrimethoxysilane (hereinafter also referred to as "IPEOS") was substituted for the toluene solution of GPMOS. The conditions of the modification and condensation and the results of the reaction are shown in Table 1.

EXAMPLE 6 (PRODUCTION OF MODIFIED POLYMER F)

A 5-liter autoclave whose inside atmosphere was replaced with nitrogen gas was charged with 2.4 kg of cyclohexane and 300 g of 1,3-butadiene under nitrogen gas. A catalyst, which was previously prepared by reacting and maturing a cyclohexane solution of neodymium versatate (0.09 mmol), a toluene solution of MAO (1.8 mmol), a toluene solution of DIBAH (5.0 mmol) and diethylaluminum chloride (0.18 mmol), and 1,3-butadiene (4.5 mmol) as catalyst components at 50° C. for 30 minutes, was added thereto, and polymerization was conducted at 80° C. for 60 minutes. The reaction conversion of 1,3-butadiene was approximately 100%. Then, 200 g of the resulting polymer solution was taken out, and a methanol solution containing 1.5 g of 2,4-di-tert-butyl-p-cresol was added thereto to terminate polymerization. Thereafter, the solvent was removed by steam stripping, and the resulting reaction product was dried on rolls at 110° C. to obtain a premodified polymer. The results of the, polymerization reaction are shown in Table 1.

Further, the remaining polymer solution was maintained at 60° C., and a toluene solution of GPMOS (4.5 mmol) was added thereto, followed by reaction for 30 minutes. Subsequently, a toluene solution of 3-aminopropyltriethoxysilane (hereinafteralsoreferredtoas "APEOS") (13.5mmol) wasadded, and mixed for 30 minutes. Further, a toluene solution of BEHAT (13.5 mmol) was added, and mixed for 30 minutes. Thereafter, a methanol solution containing 1.5 g of 2,4-di-tert-butyl-p-cresol was added thereto to obtain 2.5 kg of a modified polymer solution.

Then, the above-mentioned modified polymer solution was added to 20 liters of an aqueous solution adjusted to pH 10 with sodium hydroxide, and condensation reaction was conducted at 110° C. for 2 hours, together with desolvation. The resulting reaction product was dried on rolls at 110° C. to obtain a modified polymer. The conditions of the modification and condensation and the results of the reaction are shown in Table 1.

EXAMPLE 7 (PRODUCTION OF MODIFIED POLYMER G)

A modified polymer was produced by the same manner as with Example 6 with the exception that a toluene solution of N-(3-triethoxysilylpropyl)-4,5-dihydroimidazole (hereinafter also referred to as "EOSDI") was substituted for the toluene solution of APEOS. The conditions of the modification and condensation and the results of the reaction are shown in Table 1.

COMPARATIVE EXAMPLE 1 (PRODUCTION OF MODIFIED POLYMER H)

A modified polymer was produced by the same manner as with Example 1 with the exception that water of pH 7 was substituted for the aqueous solution adjusted to pH 10 with sodium hydroxide. The conditions of the modification and condensation and the results of the reaction are shown in Table 1.

COMPARATIVE EXAMPLE 2 (PRODUCTION OF MODIFIED POLYMER I)

A modified polymer was produced by the same manner as with Example 1 with the exception that condensation reaction was conducted at 80° C. for 2 hours, together with desolvation. The conditions of the modification and condensation and the results of the reaction are shown in Table 1.

COMPARATIVE EXAMPLE 3 (PRODUCTION OF MODIFIED POLYMER J)

A modified polymer was produced by the same manner as with Example 1 with the exception that no BEHAT was added. The conditions of the modification and condensation and the results of the reaction are shown in Table 1.

COMPARATIVE EXAMPLE 4 (PRODUCTION OF MODIFIED POLYMER K)

A 5-liter autoclave whose inside atmosphere was replaced with nitrogen gas was charged with 2.4 kg of cyclohexane and 300 g of 1,3-butadiene under nitrogen gas. A catalyst, which was previously prepared by reacting and maturing a cyclohexane solution of neodymium versatate (0.09 mmol), a toluene solution of MAO (1.8 mmol), a toluene solution of DIBAH (5.0 mmol) and diethylaluminum chloride (0.18 mmol), and 1,3-butadiene (4.5 mmol) as catalyst components at 50° C. for 30 minutes, was added thereto, and polymerization was conducted at 80° C. for 60 minutes. The reaction conversion of 1,3-butadiene was approximately 100%. Then, 200 g of the resulting polymer solution was taken out, and a methanol solution containing 1.5 g of 2,4-di-tert-butyl-p-cresol was added thereto to terminate polymerization. Thereafter, the solvent was removed by steam stripping, and the resulting reaction product was dried on rolls at 110° C. to obtain a premodified polymer. The results of the polymerization reaction are shown in Table 1.

Further, a methanol solution containing 1.5 g of 2,4-di-tert-butyl-p-cresol was added to the remaining polymer solution to terminate polymerization. Then, subsequently, a toluene solution of BEHAT (13.5 mmol) was added thereto, followed by mixing for 30 minutes to obtain 2.5 kg of a polymer solution.

Then, the above-mentioned polymer solution was added to 20 liters of an aqueous solution adjusted to pH 10 with sodium hydroxide, and desolvation was conducted at 110° C. for 2 hours. The resulting product was dried on rolls at 110° C. to obtain a polymer. The results of synthesis of the polymer are shown in Table 1.

COMPARATIVE EXAMPLE 5 (PRODUCTION OF MODIFIED POLYMER L)

A modified polymer was produced by the same manner as with Example 6 with the exception that water of pH 7 was substituted for the aqueous solution adjusted to pH 10 with sodium hydroxide. The conditions of the modification and condensation and the results of the reaction are shown in Table 1.

COMPARATIVE EXAMPLE 6 (POLYMER M)

The results of analysis of a commercially available polybutadiene rubber (Polybutadiene Rubber BR01 manufactured by JSR Corporation) are shown in Table 1.

Using the polymers of Examples 1 to 7 and Comparative Examples 1 to 6, the test of stability with time was carried out.

That is to say, each polymer was allowed to stand in a temperature controlled bath at 90° C. for 2 days, and then, evaluation was made from a change in Mooney viscosity ($ML_{1+4}$, 125° C.). The test results are shown in Table 1.

The results of Examples 1 to 3 and Comparative Examples 1 and 2 reveal that the stability with time is improved by optimizing the conditions of the condensation reaction. The results of Examples 6 and 7 and Comparative Example 5 reveal that addition of the functional group-introducing agent provides similar results. Further, the results of Examples 1 and 4 and Comparative Example 3 reveal that addition of BEHAT and DBTDL accelerates the condensation reaction to improve the stability with time.

EXAMPLES 8 TO 14 AND COMPARATIVE EXAMPLES 7 to 12

Using polymers A to M of Examples 1 to 7 and Comparative Examples 1 to 6, silica-containing rubber compositions (formulation 1) and carbon black-containing rubber compositions (formulation 2) were prepared as shown in Table 2.

For these unvulcanized rubber compositions, the Mooney viscosity was measured. Then, the composition of formulation 1 was vulcanized at 150° C. for 12 minutes, and the composition of formulation 2 was vulcanized at 145° C. for 30 minutes. The physical properties of the resulting vulcanized rubbers were evaluated. The results thereof are shown in Table 3.

The results of the silica-containing rubber compositions of Examples 8 and 11 and Comparative Example 9 reveal that addition of BEHAT and DBTDL as condensation accelerators largely improves low heat buildup and low-temperature characteristics. Further, the results of the silica-containing rubber compositions of Examples 8 and 12 and Comparative Example 10 reveal that addition of BEHAT alone does not give the effect of improving low heat buildup and low-temperature characteristics, and that the addition of BEHAT in combination with the alkoxysilane compound is required for improving them.

TABLE 1

Results of Polymerization Reaction

|  | Mooney Viscosity $ML_{1+4}$ (100° C.) | Molecular Weight Distribution Mw/Mn*1 | Cis-1,4-Bond Content (%) | 1,2-Vinyl Bond Content (%) | Modifier*2 | Functional Group-Introducing Agent*2 |
|---|---|---|---|---|---|---|
| Example 1 | 20 | 2.2 | 97.1 | 1.1 | GPMOS (4.5 mmol) | — |
| Example 2 | 18 | 2.1 | 96.7 | 1.2 | GPMOS (4.5 mmol) | — |
| Example 3 | 21 | 2.1 | 97.2 | 1.0 | GPMOS (4.5 mmol) | — |
| Example 4 | 20 | 2.3 | 96.6 | 1.1 | GPMOS (4.5 mmol) | — |
| Example 5 | 19 | 2.2 | 97.2 | 1.0 | IPEOS (4.5 mmol) | — |
| Example 6 | 20 | 2.3 | 96.5 | 1.1 | GPMOS (4.5 mmol) | APEOS (13.5 mmol) |
| Example 7 | 20 | 2.1 | 96.9 | 1.0 | GPMOS (4.5 mmol) | EOSDI (13.5 mmol) |
| Comparative Example 1 | 21 | 2.3 | 96.2 | 1.3 | GPMOS (4.5 mmol) | — |
| Comparative Example 2 | 20 | 2.2 | 97.2 | 1.2 | GPMOS (4.5 mmol) | — |
| Comparative Example 3 | 18 | 2.3 | 97.3 | 1.2 | GPMOS (4.5 mmol) | — |
| Comparative Example 4 | 19 | 2.3 | 96.4 | 1.1 | — | — |
| Comparative Example 5 | 21 | 2.2 | 96.6 | 1.0 | GPMOS (4.5 mmol) | APEOS (13.5 mmol) |
| Comparative Example 6*4 | 45 | 4.0 | 95.0 | 2.5 | — | — |

|  | Conditions of Modification Reaction | | | Results of Modification and Condensation Reactions | | | Stability with Time Mooney |
|---|---|---|---|---|---|---|---|
|  | Condensation Accelerator*2 | PH of Aqueous Solution | Temp. of Aqueous Solution (° C.) | Mooney Viscosity $ML_{1+4}$ (125° C.) | Molecular Weight Distribution Mw/Mn*1 | Cold Flow (mg/min) | Viscosity $\Delta ML_{1+4}$ (125° C.), 90° C., after 2 days |
| Example 1 | BEHAT (13.5 mmol) | 10 | 110 | 70 | 3.1 | 0.1 | 1 |
| Example 2 | BEHAT (13.5 mmol) | 12 | 110 | 67 | 3.0 | 0.2 | 1 |
| Example 3 | BEHAT (13.5 mmol) | 10 | 125 | 71 | 2.9 | 0.1 | 1 |

TABLE 1-continued

| | | | | | | | |
|---|---|---|---|---|---|---|---|
| Example 4 | DBTDL (13.5 mmol) | 10 | 110 | 65 | 2.8 | 0.1 | 2 |
| Example 5 | BEHAT (13.5 mmol) | 10 | 110 | 63 | 3.1 | 0.2 | 2 |
| Example 6 | BEHAT (13.5 mmol) | 10 | 110 | 64 | 3.4 | 0.1 | 2 |
| Example 7 | BEHAT (13.5 mmol) | 10 | 110 | 62 | 3.3 | 0.1 | 2 |
| Comparative Example 1 | BEHAT (13.5 mmol) | 7 | 110 | 55 | 2.9 | 0.5 | 13 |
| Comparative Example 2 | BEHAT (13.5 mmol) | 10 | 80 | 44 | 2.5 | 1.2 | 18 |
| Comparative Example 3 | — | 10 | 110 | 58 | 2.9 | 0.6 | 9 |
| Comparative Example 4 | BEHAT*3 (13.5 mmol) | 10 | 110 | 19 | 2.3 | 9.6 | 1 |
| Comparative Example 5 | BEHAT (13.5 mmol) | 7 | 110 | 54 | 2.8 | 0.7 | 9 |
| Comparative Example 6*4 | — | — | — | — | — | 0.4 | 1 |

TABLE 2

| Contents of Formulation (parts) | Formulation 1 | Formulation 2 |
|---|---|---|
| Polymers A to M | 70 | 50 |
| Natural Rubber | 30 | 50 |
| Silica*1 | 55 | 0 |
| Carbon Black*2 | 0 | 50 |
| Aromatic Oil*3 | 10 | 10 |
| Stearic Acid | 2 | 2 |
| Silane Coupling Agent*4 | 5.5 | 0 |
| Antioxidant*5 | 1 | 1 |
| Zinc Oxide | 3 | 3 |
| Vulcanization Accelerator DPG*6 | 1 | 0.5 |
| Vulcanization Accelerator DM*7 | 1 | 0.5 |
| Vulcanization Accelerator NS*8 | 1 | 0.5 |
| Sulfur | 1.5 | 1.5 |

TABLE 3

| | | Formulation 1 (Silica-Containing Rubber Compositions) | | | | | Formulation 2 (Carbon Black - Containing Rubber Composition) | | | | |
|---|---|---|---|---|---|---|---|---|---|---|---|
| | Polymer | Mooney Viscosity $ML_{1+4}$ (100° C.) | Tensile Strength $T_B$ (MPa) | Low Heat Build Up 3% tanδ*1 | Low Temperature Characteristics −20° C. G'*1 | Wear Resistance*1 | Mooney Viscosity $ML_{1+4}$ (100° C.) | Tensile Strength $T_B$ (MPa) | Low Heat Build Up 3% tanδ*1 | Wear Resistance*1 |
| Example 8 | A | 69 | 21.3 | 125 | 160 | 124 | 100 | 26.4 | 121 | 123 |
| Example 9 | B | 67 | 20.2 | 127 | 155 | 126 | — | — | — | — |
| Example 10 | C | 71 | 20.8 | 128 | 157 | 128 | — | — | — | — |
| Example 11 | D | 70 | 21.2 | 119 | 152 | 125 | 98 | 26.8 | 125 | 119 |
| Example 12 | E | 68 | 19.9 | 115 | 144 | 121 | 102 | 25.3 | 128 | 121 |
| Example 13 | F | 68 | 21.8 | 125 | 148 | 123 | 95 | 28.5 | 132 | 127 |
| Example 14 | G | 69 | 21.5 | 121 | 145 | 126 | 97 | 27.9 | 127 | 123 |
| Comparative Example 7 | H | 68 | 20.7 | 118 | 144 | 116 | 99 | 25.1 | 116 | 112 |
| Comparative Example 8 | I | 67 | 21.2 | 122 | 151 | 122 | — | — | — | — |
| Comparative Example 9 | J | 66 | 21.1 | 110 | 128 | 124 | — | — | — | — |
| Comparative Example 10 | K | 55 | 20.1 | 105 | 117 | 110 | — | — | — | — |
| Comparative Example 11 | L | 71 | 21.2 | 111 | 144 | 122 | 98 | 27.5 | 114 | 115 |

TABLE 3-continued

| | | Formulation 1 (Silica-Containing Rubber Compositions) | | | | | Formulation 2 (Carbon Black - Containing Rubber Composition) | | | |
|---|---|---|---|---|---|---|---|---|---|---|
| | Polymer | Mooney Viscosity $ML_{1+4}$ (100° C.) | Tensile Strength $T_B$ (MPa) | Low Heat Build Up 3% tanδ*1 | Low Temperature Characteristics −20° C. G'*1 | Wear Resistance*1 | Mooney Viscosity $ML_{1+4}$ (100° C.) | Tensile Strength $T_B$ (MPa) | Low Heat Build Up 3% tanδ*1 | Wear Resistance*1 |
| Comparative Example 12 | M | 73 | 17.4 | 100 | 100 | 100 | 83 | 25.8 | 100 | 100 |

In Table 1, *1 to *4 are as follows:
*1 The ratio of the weight average molecular weight (Mw) to the number average molecular weight (Mn)
*2 GPMOS; 3-glycidoxypropyltrimethoxysilane
IPEOS; 3-isocyanatopropyltriethoxysilane
APEOS; 3-aminopropyltriethoxysilane
EOSDI; N-(3-triethoxysilylpropyl)-4,5-dihydroimidazole
BEHAT; bis(2-ethylhexanoate)tin
DBTDL; dibutyltin dilaurate
*3 After the polymerization was terminated, BEHAT was added, followed by mixing.
*4 A commercially available polybutadiene rubber manufactured by JSR Corporation (JSR BR01)
In Table 2, *1 to *7 are as follows:
*1 Nipsil (trade name) manufactured by Nippon Silica Industrial Co., Ltd.
*2 Seast KH (trade name) manufactured by Tokai Carbon Co., Ltd.
*3 Fukkol Aromax #3 (trade name) manufactured by Fuji Kosan Co., Ltd.
*4 Si69 (trade name) manufactured by Degussa AG, material name; bis(3-triethoxysilylpropyl)tetrasulfide
*5 Nocrac 6C manufactured by Ouchishinko Chemical Industrial Co., Ltd., material name; N-phenyl-N'-(1,3-dimethylbutyl) p-phenylenediamine
*6 Nocceler D manufactured by Ouchishinko Chemical Industrial Co., Ltd., material name; 1,3-diphenylguanidine
*7 Nocceler DM manufactured by Ouchishinko Chemical Industrial Co., Ltd., material name; di-2-benzothiazolyldisulfide
*8 Nocceler NS-F manufactured by Ouchishinko Chemical Industrial Co., Ltd., material name; N-t-butyl-2-benzothiazolylsulfenamide
In Table 3, *1 is as follows:
*1 Taking the value of Comparative Example 12 as 100, a larger value shows better wear resistance.

According to the present invention, it is possible to produce the modified conjugated diene polymer in which quality stability in the production thereof is maintained, by improving stability with time. Further, in either case of silica compounding or carbon black compounding, there can be provided the rubber composition excellent in processability, and excellent in breaking characteristics, low heat buildup, low temperature characteristics and wear resistance even when it is subjected to vulcanization treatment to form a vulcanized rubber.

Accordingly, the rubber composition containing the modified conjugated diene polymer of the present invention can be used for applications, such as a rubber vibration isolator, a fender beam, a belt, a hose and other industrial products, including tire applications such as a tire tread, an under tread, a carcass, a side wall and a bead portion. In particular, the rubber composition is suitably used as a rubber for a tire tread.

The invention claimed is:

1. A method for producing a modified conjugated diene polymer, the method comprising two steps of:
   a step of modifying an active end of an active end-containing conjugated diene polymer having a cis-1,4-bond content of 75% or more with an alkoxysilane compound containing at least one functional group selected from the group consisting of (a) an epoxy group, (b) an isocyanate group and (c) a carboxyl group, and
   a step of adding a condensation accelerator to conduct condensation reaction of the alkoxysilane compound (residue) in an aqueous solution having a pH of 9 to 14 and a temperature of 85 to 180° C.

2. The method according to claim 1, wherein the alkoxysilane compound is at least one compound selected from the group consisting of 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane, 3-methacryloyloxypropyltriethoxysilane, 3-methacryloyloxypropyltrimethoxysilane, 3-methacryloyloxypropylmethyldiethoxysilane and 3-methacryloyloxypropyltriisopropoxysilane.

3. The method according to claim 1, wherein a compound containing at least one functional group selected from the group consisting of (d) an amino group, (e) an imino group and (f) a mercapto group is further added.

4. The method according to claim 1, wherein the conjugated diene compound constituting the modified conjugated diene polymer is at least one conjugated diene compound selected from the group consisting of 1,3-butadiene, isoprene and 2,3-dimethyl-1,3-butadiene.

5. The method according to claim 1, wherein the active end-containing conjugated diene polymer has a Mooney viscosity at 100° C. ($ML_{1+4}$, 100° C.) of 5 to 50.

6. The method according to claim 1, wherein the active end-containing conjugated diene polymer is a polymer obtained by polymerization using a catalyst containing the following components (g) to (i) as main components:

Component (g); a compound containing a rare earth element having an atomic number of 57 to 71 in the periodic table or a reaction product of the compound with a Lewis base;

Component (h); an alumoxane and/or an organic aluminum compound corresponding to $AlR^1R^2R^3$ (wherein $R^1$ and $R^2$, which may be the same or different, are hydrogen atoms or hydrocarbon groups having 1 to 10 carbon atoms, and $R^3$ is a hydrocarbon group having 1 to 10 carbon atoms, and may be the same as said $R^1$ and $R^2$, or different therefrom);

Component (i); a halogen-containing compound.

7. The method according to claim 1, wherein the condensation accelerator is at least one selected from the group consisting of the following components (j) and (k):

Component (j); a carboxylate of divalent tin;

Component (k); a hydroxyl group-containing or carboxyl group-containing tetravalent tin compound.

8. The method according to claim 3, wherein the condensation accelerator is at least one selected from the group consisting of the following components (j) and (k):

Component (j); a carboxylate of divalent tin;

Component (k); a hydroxyl group-containing or carboxyl group-containing tetravalent tin compound.

9. The method according to claim 3, wherein the functional group-containing compound is 3-diethylaminopropyl(triethoxy)silane, 3-dimethylaminopropyl(triethoxy)silane, 3-aminopropyltriethoxysilane, 3-(1-hexamethyleneimino)propyl(triethoxy)silane, N-(1-methylpropylidene)-3-(triethoxysilyl)-1-propaneamine, N-(1,3-dimethylbutylidene)-3-(triethoxysilyl)--1-propaneamine, 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole or 3-mercaptopropyltriethoxysilane.

10. The method according to claim 7, wherein the condensation accelerator is tin bis(n-octanoate), tin bis(2-ethylhexanoate), tin bis(laurate), tin bis(naphthoate), tin bis(stearate), tin bis(oleate), dibutyltin diacetate, dibutyltin di-n-octanoate, dibutyltin 2-ethylhexanoate, dibutyltin dilaurate, dibutyltin maleate, dibutyltin bis(benzylmaleate), dibutyltin bis(2-ethylhexylmaleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzylmaleate) or di-n-octyltin bis(2-ethylhexylmaleate).

* * * * *